Figure 2:
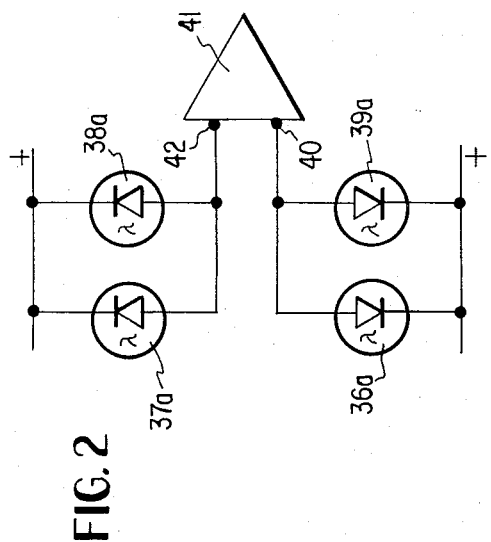

United States Patent
Carnel

[11] 3,778,619
[45] Dec. 11, 1973

[54] INPUT CONNECTIONS FOR DIFFERENTIAL AMPLIFIERS

[75] Inventor: Alain Carnel, Paris, France

[73] Assignee: Compteurs Schlumberger, Montrouge, France

[22] Filed: Mar. 22, 1972

[21] Appl. No.: 236,926

[30] Foreign Application Priority Data
Jan. 28, 1971 France .............................. 7109978

[52] U.S. Cl. .................................. 250/225, 324/96
[51] Int. Cl. ............................................. G02t 1/18
[58] Field of Search ...................... 250/225; 324/96; 350/151; 324/189, 190

[56] References Cited
UNITED STATES PATENTS
| | | | |
|---|---|---|---|
| 3,419,802 | 12/1968 | Pelenc | 324/96 |
| 3,632,216 | 1/1972 | Cary | 250/225 |
| 3,629,703 | 12/1971 | Bernard | 324/96 |
| 3,581,202 | 5/1971 | Pelenc | 324/96 |

*Primary Examiner*—James W. Lawrence
*Assistant Examiner*—D. C. Nelms
*Attorney*—William R. Sherman et al.

[57] ABSTRACT

Two polarized light beams from the same source are rotated by passage through Faraday rods having windings supplied by a current to be measured. The beams are then counterrotated by passage through second Faraday rods having windings supplied by a compensating current. Each beam is then applied to a beam splitting semi-reflective mirror which displaces it into distinguishable components. Optical analyzers then attenuate each beam in accordance with a function of the angular displacement from reference or preferential polarization planes. Pairs of photoresponsive detectors transduce the resulting beams into pairs of electrical signals, each pair having a signal of different sign or sense. Signals of like sign are then combined and the two resulting signals are applied to the two inputs of a differential amplifier. The amplifier output is used to develop a proportional compensation signal for the second Faraday rods and can be displayed as a measure of input current.

4 Claims, 3 Drawing Figures

PATENTED DEC 11 1973   3,778,619

INPUT CONNECTIONS FOR DIFFERENTIAL AMPLIFIERS

This invention relates to an improvement in the manner of using a differential amplifier for signal processing and a technique for enhancing the desired characteristics of signal input information.

The apparatus of the present invention is primarily concerned with apparatus involving current measuring transducers which modify the angular orientation of polarized light supplied thereto, the degree of rotation being indicative of the amplitude of current supplied to the transducers. Examples of such devices can be found in British Pat. No. 1,207,540 to Compagnie des Compteurs and counterpart French Pat. No. 1,508,357.

In those patents the fundamental apparatus for making current measurements is described, this apparatus including Faraday bodies of flint glass or the like having high Verdet constants. The light passing therethrough is applied to photocells, one photocell for each channel being supplied. The output resulting from the photocells is used as a measure of the current applied, and is also used to develop a feedback signal to compensating transducers which effectively counteract the effect of stray magnetic fields. The mathematical and theoretical basis for the fundamental operation of such equipment is fully described in the aforementioned patents and will not be treated in any additional detail here.

It will be seen that the prior art devices direct each of the signals which are coming from the same light source and which have been processed through different light paths toward the inputs of a differential device, each input being exclusively reserved for the output of a single path. These known devices have the fundamental disadvantage of not eliminating the spurious and fortuitous variations in signal characteristics which are generated in the paths themselves and do not represent any variation which is intended to be detected. As a result, these fortuitous differences are confused with the systematic variations to be analyzed and errors, which can be considerable, are introduced.

Accordingly, it is an object of the present invention to provide a system of interconnecting these paths and the inputs of the differential amplifier in a manner which will eliminate such spurious variations arising from the signal paths.

It is a further object to provide a more general technique for the interconnection of inputs to a differential amplifier to reduce variations due to fortuitous influences.

Briefly described, the present invention includes means at the output end of each path for deriving signal components which have distinguishable signs or senses, one signal component from each path having sign characteristics similar to those of one of the pair of components from the other path. The signal components from the two paths are then additively combined in a manner which tends to reinforce the desired signal characteristics and minimize those fortuitous variations which are to be eliminated and the signals thus combined are applied to the inputs of the differential amplifier. The amplifier thus amplifies only the systematic differences preserved, which are the only ones to be examined, these differences being maintained at each input by the system of "marking" or identifying the divided signal components.

In the specific embodiment described herein, various forms of energy, both optical and electrical, are used. Two polarized light beams coming from the same source are rotated by the Faraday effect by passage through rods having high Verdet constants, each of these first rods being surrounded by a coil or winding through which passes the high tension line current to be checked. The rotation of the plane of polarization of each beam is proportional to the intensity of the current in the line. Each light beam is then passed through a second rod of the same glass, each of these second rods being surrounded by a coil connected to a compensation circuit, the function of which is to rotate the polarization plane of each beam toward its original position. The compensation current supplied to the windings around the second rods is proportional to the current in the high tension line and permits that current to be measured. The use of two parallel optical paths renders the assembly astatic, i.e., independent of disturbing magnetic fields. Each beam is then applied to a semi-reflecting mirror which displaces the beam into 45° separated components, each component then being applied to an optical analyzer which is of a type to provide a light output signal which is a function of the angular relationship between the plane of polarization of the input beam and the preferential axis of the analyzer. The output of the analyzer is a cosine squared function, the output being proportional to the square of the cosine of the angle between the polarization plane of the incoming beam and the analyzer preferential axis. The outputs of the analyzers are applied to photoresponsive devices which transduce the signals into electrical signals which are then combined and applied to the inputs of the differential amplifier.

Figure 3:
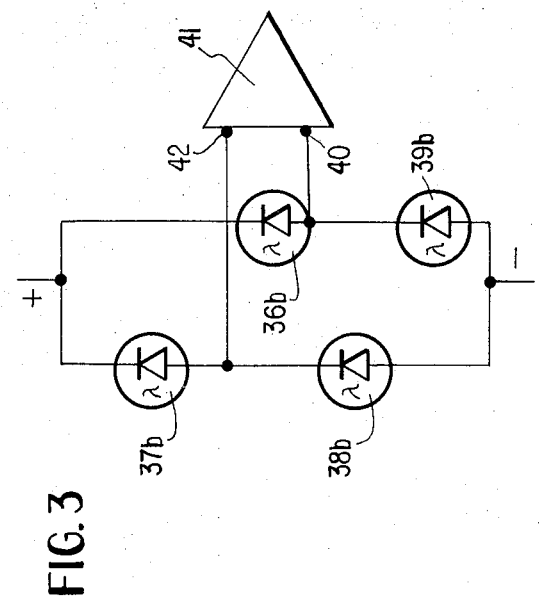
Figure 1:
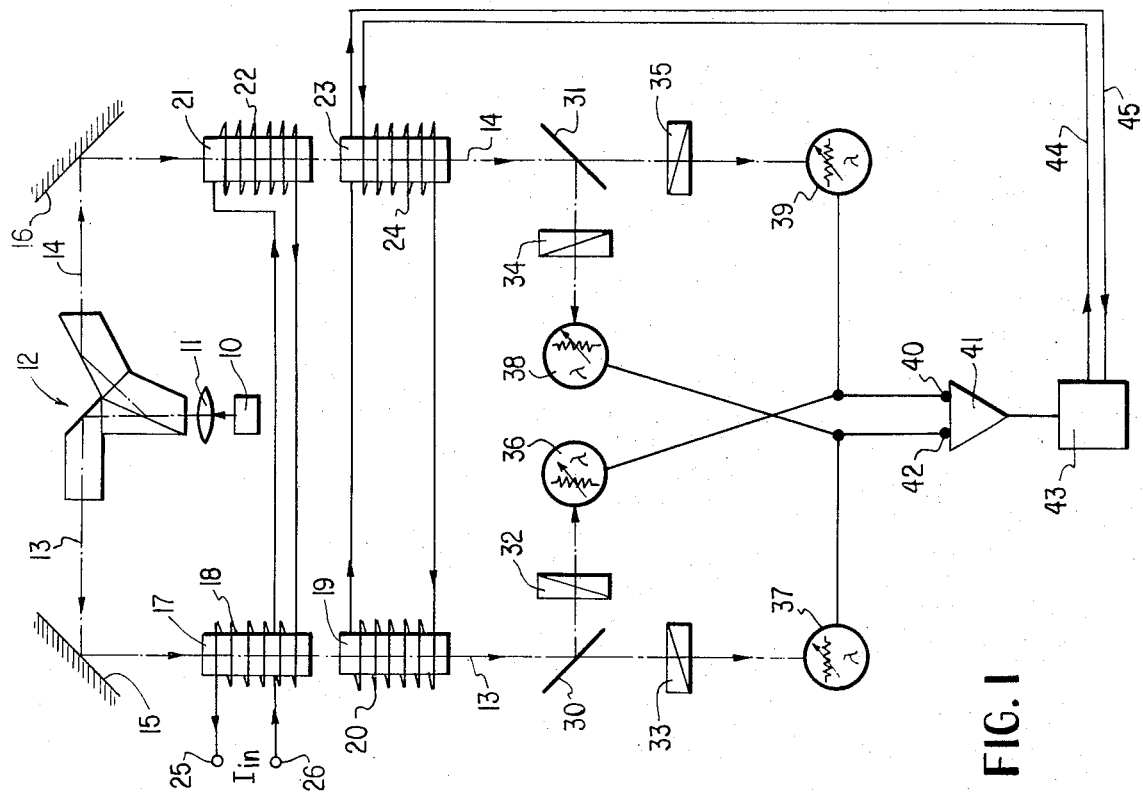

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a schematic diagram of an optical-electrical system in accordance with the present invention; and FIGS. 2 and 3 show alternative interconnecting arrangements of a portion of the apparatus of FIG. 1.

Referring now to the drawings in detail, it will be seen that a light source 10 provides a beam of light, which is preferably monochromatic, through a condensing lens 11 to a prism system indicated generally at 12. The prism system, which will not be described in detail herein, is a conventional optical device which performs the dual functions of separating the light beam into two component parts which are projected along paths 13 and 14, and polarizing the light so that the beams 13 and 14 have a specific plane of polarization. The light beams are then reflected from mirror surfaces 15 and 16, beam 13 being directed into a Faraday body 17 which is surrounded by a winding 18. As previously discussed, body 17 is a cylindrical body of flint glass or the like having a high Verdet constant and, when it is subjected to a magnetic field created by passing a current through winding 18, rotates the plane of polarization of beam 13. The beam emerging from body 17 immediately enters a second Faraday body 19 which is surrounded by a winding 20, bodies 17 and 19 being substantially identical and windings 18 and 20 being substantially identical except that the direction of winding of 20 is opposite to that of 18. As a result, the polarization plane is caused to be rotated in the opposite direction in body 19 from that in body 17.

Beam 14 enters a similar assembly including a Faraday body 21 surrounded by a winding 22, which body causes rotation of the beam, the emerging beam then being directed to a Faraday body 23 which is surrounded by a winding 24. Bodies 21 and 23 are substantially identical, as are windings 22 and 24 except that winding 24 is opposite in direction to winding 22.

Windings 18 and 22 are connected in series circuit relationship between terminals 25 and 26 to which the input current to be measured, $I_{in}$ is connected. Windings 18 and 22 are substantially identical except that they are of opposite senses.

Similarly, windings 20 and 24 are connected in series circuit relationship, winding 24 being wound in the opposite direction to winding 20, the windings otherwise being substantially identical. It is to windings 20 and 24 that the compensation current will be applied.

The light beams emanating from bodies 19 and 23 thus have planes of polarization which have been rotated by the magnetic fields in their respective paths and are applied to semi-reflective mirrors 30 and 31, respectively. The beam encountering mirror 30 is partially reflected to an optical analyzer 32 and partially transmitted to an optical analyzer 33, analyzers 32 and 33 being of substantially identical characteristics. Similarly, the beam encountering mirror 31 is partially reflected and partially transmitted to optical analyzers 34 and 35 respectively, analyzers 34 and 35 likewise being of substantially identical characteristics. Each of analyzers 32–35 is of a type which is characterized by a preferential polarization plane such that light entering the analyzer colinear with that plane is permitted to pass through with substantially zero attenuation while light encountering the analyzer at any angle with the preferential plane is attenuated so that the resulting output of the analyzer is a cosine squared function of the input. Each such attenuator is of substantially the same type as that disclosed in the aforementioned British Pat. No. 1,207,540.

The light beams emerging from analyzers 32–35 are directed to photoresponsive devices 36, 37, 38 and 39, respectively. These devices are symbolically represented as photoresponsive variable resistors, but, in actual practice, can be any form of transducer which responds to incident radiation by producing or varying an output electrical signal. The electrical outputs of transducers 36 and 39 are connected together and to an input 40 of a conventional differential amplifier 41. The electrical outputs of transducers 37 and 38 are connected together and to the other input 42 of amplifier 41.

The output of amplifier 41 is representative of the input current and is coupled to a utilization device 43 which can include a display device for indicating the magnitude of the input current and which also produces a compensating current output on conductors 44 and 45. This compensating current is supplied to windings 20 and 24, as previously discussed.

As previously discussed, the four analyzers 32–35 are oriented in such a manner that they give the same particular sign, indicative of orientation, to the beams illuminating the photoresponsive devices which supply a specific input to amplifier 41. The orientations of the analyzers can be established so that they have a preferential plane disposed at 45° to the plane of polarization defined by the polarizer in directions such that, for analyzers 33 and 34, which are coupled in photocells 37 and 38, which in turn are connected to input 42, the intensities of the beams which illuminate the cells 37 and 38 vary in the same sense under the effect of variations in the phenomenon observed; and in the opposite sense with respect to the analyzers 32 and 35, which are connected to cells 36 and 39 which, in turn, are connected to input 40 of the differential amplifier. The signals entering the differential amplifier by the input 42 are thus given the same sign by analyzers 37 and 38, whereas signals entering by input 40 are given another sign by analyzers 36 and 39. The differences in the illumination of the cells due to the optical impurities which can occur fortuitously on the paths of the beam are thus compensated at the inputs of the differential amplifier. The resulting signal thus preserves only the characteristics of the phenomenon which it is desired to observe, i.e., in the case of the application described, the angles of rotation of the plane of polarization of the light.

Turning now to FIGS. 2 and 3, it will be seen that alternative connections of the photoresponsive elements to the inputs of the differential amplifier are disclosed. In those figures, the photoresponsive elements have been illustrated as photodiodes, the diodes being identified by the same identifying numerals as in FIG. 1 but with the additional letter a for the elements in FIG. 2 and b in FIG. 3.

Thus, it will be seen that the cathodes of diodes 37a and 38a are connected to a positive source of voltage. The anodes of those diodes being connected to terminal 42. Similarly, the cathodes of diodes 36a and 39a are connected to a positive source with the cathode thereof being connected to terminal 40. Variations in the characteristics of these diodes will therefore be additively combined, in the pairs connected together, and supplied to the differential amplifier input.

In FIG. 3, the associated photodiodes 37b and 38b are connected in series circuit relationship between a positive and a negative source of voltage with the intermediate junction being connected to terminal 42. A series circuit including diodes 36b and 39b is connected in parallel with the first diode circuit, the intermediate junction thereof being connected to input terminal 40.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for the differential processing of radiant energy signals received by photodetectors from a light source, the source being of the type which emits beams over two different paths, each beam having an identifiable characteristic affected by an input signal whereby fortuitous influences on the paths are eliminated, the apparatus comprising:

beam splitting means in each of the paths for splitting each beam into two components, each component having identifiable characteristics;

a pair of photodetectors associated with each of said beam splitting means for separately detecting said two components and for producing electrical signals representative thereof;

optical analyzer means disposed in the beam path between each of said photodetectors and its associated beam splitting means for attenuating said beam as a predetermined function of its identifiable characteristic;
a differential amplifier having two inputs; and
means connecting one input of said amplifier to receive the electrical signals produced by one photodetector of each pair, and the other input to receive the electrical signals produced by the remaining photodetectors.

2. An apparatus according to claim 1, wherein each two photodetectors which produce the signals connected to the same input of the differential amplifier are electrically connected in series circuit relationship with each other.

3. An apparatus according to claim 1 wherein each two photodetectors which produce the signals connected to the same input of the differential amplifier are electrically connected in parallel circuit relationship with each other.

4. Appparatus comprising first and second polarized light beams having planes of polarization at angles representative of a variable to be measured; means for separating each of said light beams into a pair of components which are angularly displaced from each other; a differential amplifier; means for receiving each component of said pairs of components and for producing electrical signals representative thereof; and means for combining and providing to one input of said amplifier from each of said pairs of components a signal representative of a component which was angularly displaced in a first direction, and for combining and providing to the other input of said amplifier signals representative of the remaining ones from said pairs of components.

* * * * *

UNITED STATES PATENT OFFICE
CERTIFICATE OF CORRECTION

Patent No. 3,778,619                     Dated December 11, 1973

Inventor(s) Alain Carnel

It is certified that error appears in the above-identified patent and that said Letters Patent are hereby corrected as shown below:

FOREIGN APPLICATION PRIORITY DATA

The French application, on which priority was claimed, should be changed from "January 28, 1971" to -- March 22, 1971 -- .

Signed and sealed this 23rd day of July 1974.

(SEAL)
Attest:

McCOY M. GIBSON, JR.          C. MARSHALL DANN
Attesting Officer             Commissioner of Patents